(12) United States Patent
Keller et al.

(10) Patent No.: US 11,660,684 B2
(45) Date of Patent: May 30, 2023

(54) METHOD AND APPARATUS FOR MACHINING A WORKPIECE

(71) Applicant: Quantum Impact, LLC, Troy, MI (US)

(72) Inventors: Randy Keller, Harper Woods, MI (US); J. Scott Myles, Bloomfield Township, MI (US); Colin Kelly Myles, Waterford, MI (US)

(73) Assignee: Quantum Impact, LLC, Troy, MI (US)

( * ) Notice: Subject to any disclaimer, the term of this patent is extended or adjusted under 35 U.S.C. 154(b) by 261 days.

(21) Appl. No.: 17/098,866

(22) Filed: Nov. 16, 2020

(65) Prior Publication Data

US 2021/0060660 A1 Mar. 4, 2021

Related U.S. Application Data

(63) Continuation of application No. 16/253,294, filed on Jan. 22, 2019, now Pat. No. 10,864,580.

(Continued)

(51) Int. Cl.
| | | |
|---|---|---|
| *B23B 35/00* | (2006.01) | |
| *B23Q 15/12* | (2006.01) | |
| *B23B 29/12* | (2006.01) | |

(52) U.S. Cl.
CPC ............ *B23B 35/00* (2013.01); *B23B 29/125* (2013.01); *B23Q 15/12* (2013.01);
(Continued)

(58) Field of Classification Search
CPC ........... B23Q 5/027–5/20; B23Q 15/12; B32B 29/125; B32B 37/00; B32B 2260/0625;
(Continued)

(56) References Cited

U.S. PATENT DOCUMENTS

| | | | |
|---|---|---|---|
| 3,532,174 A | | 10/1970 | Diamantides |
| 4,646,595 A | * | 3/1987 | Slee ...................... B23B 29/125 |
| | | | 82/904 |

(Continued)

FOREIGN PATENT DOCUMENTS

| | | | | |
|---|---|---|---|---|
| CN | 204827244 U | | 12/2015 | |
| CN | 113084593 A | * | 7/2021 | ............. B23B 41/00 |

(Continued)

OTHER PUBLICATIONS

Machining News. "Complete Machining With Enhanced ULTRASONIC 20 Linear from DMG MORI," Mar. 16, 2016. Downloaded from: http:/www.machiningnews.com/2016/03/copmlete-machining-with-enhanced-ultrasonic-20-linear-from-dmg-mori/.

(Continued)

*Primary Examiner* — Boyer D Ashley
*Assistant Examiner* — Michael Vitale
(74) *Attorney, Agent, or Firm* — Carlson, Gaskey & Olds, P.C.

(57) ABSTRACT

An example method includes performing a machining operation by providing linear movement of a tool along a feed axis relative to a workpiece while superimposing oscillation of the tool onto the feed axis and providing rotation of the tool relative to the workpiece. During an optimization mode, the machining operation is performed on a first workpiece portion while providing the linear movement at an initial feed velocity, and sequentially superimposing the oscillating at a plurality of different frequencies. An optimal oscillation frequency is determined from the plurality of different frequencies which causes the tool to apply less force to the first workpiece portion at the initial feed velocity than others of the frequencies. During a run mode, the machining operation is performed on a second workpiece portion having a same composition as the first (Continued)

workpiece portion while superimposing the oscillation at the optimal oscillation frequency.

14 Claims, 12 Drawing Sheets

Related U.S. Application Data

(60) Provisional application No. 62/620,856, filed on Jan. 23, 2018.

(52) U.S. Cl.
CPC ............... *B23B 2260/0625* (2013.01); *B23B 2260/108* (2013.01); *B23Q 2705/14* (2013.01); *Y10T 408/03* (2015.01); *Y10T 408/675* (2015.01)

(58) Field of Classification Search
CPC ........... B32B 2260/108; B32B 2270/10; Y10S 82/904; Y10T 408/675–6793; Y10T 408/95; Y10T 408/953; Y10T 408/957; Y10T 409/309352; Y10T 409/309408; Y10T 409/309464
USPC ............... 82/904; 408/1 R, 129–137, 239 A, 408/239 R, 240; 409/231, 232, 233; 451/162–176; 700/170
See application file for complete search history.

(56) References Cited

U.S. PATENT DOCUMENTS

| | | | |
|---|---|---|---|
| 4,856,391 | A | 8/1989 | Mishiro |
| 5,113,728 | A | 5/1992 | Medeksza |
| 5,769,575 | A | 6/1998 | Stofflet et al. |
| 6,338,390 | B1 | 1/2002 | Tibbitts |
| 6,415,876 | B1 | 7/2002 | Bollinger et al. |
| 6,470,225 | B1 | 10/2002 | Yutkowitz |
| 6,877,936 | B2 * | 4/2005 | Linderholm ............ B23C 3/02 82/1.4 |
| 7,587,965 | B2 | 9/2009 | Mann et al. |
| 7,628,099 | B2 | 12/2009 | Mann et al. |
| 8,240,396 | B2 | 8/2012 | Sauer |
| 8,257,002 | B2 * | 9/2012 | Prust .................. G05B 19/404 408/1 R |
| 8,694,133 | B2 | 4/2014 | Mann et al. |
| 8,870,500 | B2 | 10/2014 | Short |
| 8,905,689 | B2 | 12/2014 | Short |
| 9,908,209 | B2 | 3/2018 | Ketelaer |
| 9,975,211 | B2 | 5/2018 | Hariki |
| 2010/0270049 | A1 | 10/2010 | Baumann |
| 2010/0296886 | A1 | 11/2010 | Prust et al. |
| 2011/0066277 | A1 | 3/2011 | Mann et al. |
| 2014/0241821 | A1 | 8/2014 | Mann et al. |
| 2017/0095897 | A1 | 4/2017 | Moraru et al. |
| 2017/0136552 | A1 | 5/2017 | Fairchild et al. |
| 2018/0039255 | A1 | 2/2018 | Ketelaer et al. |
| 2018/0065188 | A1 * | 3/2018 | Kim ..................... G05B 19/416 |
| 2018/0200854 | A1 | 7/2018 | Ketelaer |
| 2018/0243834 | A1 | 8/2018 | Sannomiya et al. |
| 2018/0281139 | A1 | 10/2018 | Yamamoto |
| 2022/0152770 | A1 * | 5/2022 | Chen ................... B23Q 15/013 |
| 2022/0355391 | A1 * | 11/2022 | Heyers .................. B23B 47/34 |

FOREIGN PATENT DOCUMENTS

| | | | | |
|---|---|---|---|---|
| DE | 3919895 | C2 * | 6/1995 | ............ B24B 1/04 |
| DE | 102020208876 | A1 * | 1/2022 | |
| EP | 1762305 | A2 | 3/2007 | |
| JP | 2006175562 | A | 7/2006 | |
| WO | 2003061886 | A1 | 7/2003 | |
| WO | WO-2006056316 | A1 * | 6/2006 | ............ B23B 37/00 |
| WO | 2007051839 | A1 | 5/2007 | |
| WO | 2016162483 | | 10/2016 | |
| WO | WO-2021199223 | A1 * | 10/2021 | ............ B23B 13/08 |

OTHER PUBLICATIONS

International Search Report and Written Opinion for International Application No. PCT/US19/14459 dated Apr. 11, 2019.

\* cited by examiner

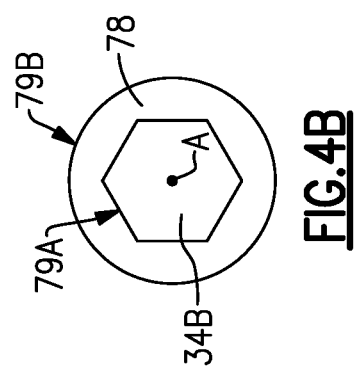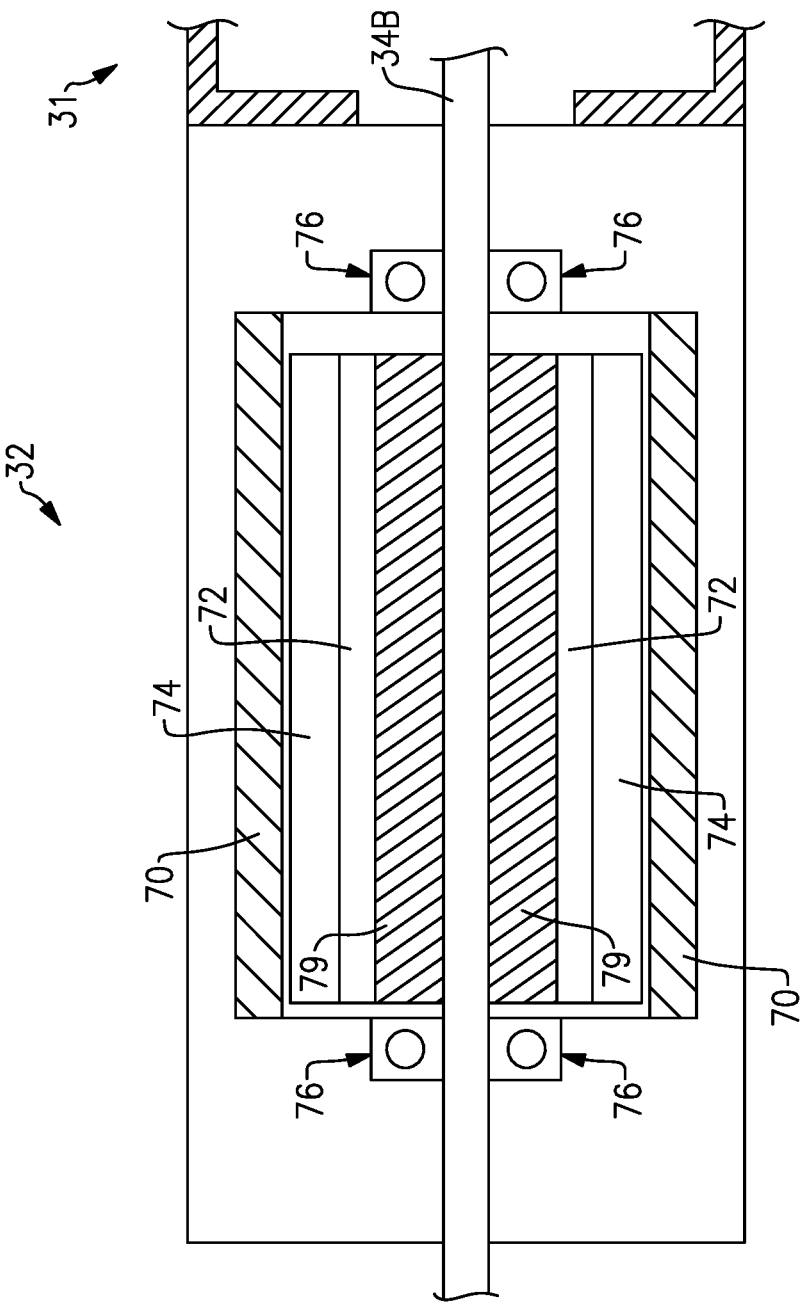

METHOD AND APPARATUS FOR MACHINING A WORKPIECE

CROSS-REFERENCE TO RELATED APPLICATIONS

This application is a continuation of U.S. application Ser. No. 16/253,294, filed Jan. 22, 2019, which claims the benefit of U.S. Provisional Application No. 62/620,856, filed Jan. 23, 2018, the disclosures of which are incorporated by reference herein in their entirety.

BACKGROUND

This application relates to machining, and more particularly to a method and apparatus for machining a workpiece.

When repetitively performing machining operations on a workpiece, such as drilling operations, it is generally desirable to perform those machining operations as quickly as possible. However, performing a machining operation too quickly can undesirably increase the thrust force and torque applied to a workpiece by a tool, potentially shortening tool life and detrimentally affecting the geometry and/or integrity of the feature desired on the workpiece.

SUMMARY

A method includes performing a machining operation by providing linear movement of a tool along a feed axis relative to a workpiece while superimposing oscillation of the tool onto the feed axis and providing rotation of the tool relative to the workpiece. During an optimization mode, the machining operation is performed on a first workpiece portion while providing the linear movement at an initial feed velocity, and sequentially superimposing the oscillating at a plurality of different frequencies. One of the plurality of different frequencies that causes the tool to apply less force to the first workpiece portion at the initial feed velocity than others of the frequencies at the initial feed velocity is determined to be an optimal oscillation frequency. During a run mode, the machining operation is performed on a second workpiece portion having a same composition as the first workpiece portion while superimposing the oscillation at the optimal oscillation frequency. The first workpiece portion and second workpiece portion are part of a same workpiece or different workpieces.

In a further embodiment of any of the foregoing embodiments, the determination of one of the plurality of different frequencies that causes the tool to apply less force to the first workpiece portion at the initial feed velocity than others of the frequencies includes determining whichever of the plurality of different frequencies causes the tool to apply a smallest amount of force to the first workpiece portion at the initial feed velocity to be the optimal oscillation frequency.

In a further embodiment of any of the foregoing embodiments, the sequential superimposing of the oscillation at a plurality of different frequencies includes performing a frequency sweep within a frequency band.

In a further embodiment of any of the foregoing embodiments, the force is a thrust force and providing the linear movement including providing current to a stator of a linear motor, and the method includes determining a thrust force applied by the tool to the first workpiece portion based on an amount of current provided to the stator.

In a further embodiment of any of the foregoing embodiments, the providing linear movement at the initial feed velocity includes adjusting an amount of current provided to the stator based on a feedback signal from a position sensor to maintain the initial feed velocity.

In a further embodiment of any of the foregoing embodiments, the force is a thrust force and the run mode is a force mode, and the method includes, during the force mode: utilizing a feed velocity for the tool that is different than the initial velocity, and controlling the thrust force applied by the tool to the second workpiece portion to be within a predefined amount of a maximum force threshold without exceeding the maximum force threshold.

In a further embodiment of any of the foregoing embodiments, providing linear movement of the tool includes advancing the tool in a first direction, and the method includes, after the machining operation, retracting the tool away from the workpiece along the feed axis in a second direction opposite the first direction, and superimposing oscillation of the tool onto the feed axis during the retracting.

In a further embodiment of any of the foregoing embodiments, the first workpiece portion has a plurality of layers, and the second workpiece portion has a plurality of layers corresponding to the plurality of layers of the first workpiece portion. The method includes, during the optimization mode, determining the optimal oscillation frequency for each of the plurality of layers of the first workpiece portion; and during the run mode, for each layer of the second workpiece portion, utilizing the optimal oscillation frequency of the corresponding layer of the first workpiece portion.

In a further embodiment of any of the foregoing embodiments, the machining operation is a drilling operation that drills a hole from a first side to a second side of a workpiece portion, the second side opposite to the first side. The method includes determining that the tool has advanced beyond the second side based on a rate of change of a feed velocity of the tool exceeding a predefined threshold.

In a further embodiment of any of the foregoing embodiments, the tool is a rotary tool that rotates about the longitudinal feed axis, and the method includes rotating the rotary tool at an approximately constant rotational velocity during the optimization mode.

In a further embodiment of any of the foregoing embodiments, during an additional optimization mode, the method includes performing the machining operation on a third workpiece portion while superimposing the oscillating at the optimal oscillation frequency and rotating the tool at a plurality of different rotational velocities. One of the plurality of different rotational velocities that causes the tool to apply less thrust force the third workpiece portion while oscillating at the optimal oscillation frequency than others of the rotational velocities at the optimal oscillation frequency is determined to be an optimal rotational velocity. During the run mode, the tool is rotated at the optimal rotational velocity. The third workpiece portion is part of a same workpiece as at least one of the first and second workpiece portions or is part of a different workpiece than each of the first and second workpiece portions.

In a further embodiment of any of the foregoing embodiments, the method includes determining that the tool has encountered a non-homogenous zone of the second workpiece portion based on a linear feed velocity of the tool changing by more than a predefined percent while the oscillating is superimposed at the optimal oscillation frequency. The method includes, based on the determination that the tool has encountered the non-homogenous zone, entering an adaptive run mode which includes sequentially superimposing the oscillating at a second plurality of different frequencies, and modifying the optimal oscillation frequency for at least the non-homogenous zone of the workpiece to one of the second plurality of different frequencies that enables the tool to apply less thrust force to the non-homogenous zone at a given feed velocity than the unmodified optimal oscillation frequency, enables the tool to travel at a higher feed velocity in the non-homogenous zone at a given thrust force than the un-modified optimal oscillation frequency, or both.

A method of operating a tool according to an example of the present disclosure includes oscillating a direct current (DC) control signal provided to a linear motor, and thereby causing the linear motor to both provide linear movement of a tool along a feed axis relative to a workpiece and superimpose oscillation of the tool onto the feed axis during the linear movement.

A machining device according to an example of the present disclosure includes a tool, and a linear motor including a core and stator that each surround a longitudinal feed axis. The linear motor is operable to provide linear movement of the tool relative to the stator along the longitudinal feed axis, and superimpose oscillation of the tool onto the feed axis during said linear movement. A rotary motor is operable to rotate the tool about the longitudinal feed axis during linear movement. A controller is operable to cause the linear motor to provide the linear movement and superimpose the oscillation by oscillating a direct current (DC) control signal provided to the linear motor.

In a further embodiment of any of the foregoing embodiments, a sensor is operable to measure at least one machining parameter related to the linear movement, rotation of the tool, or both, and the controller is operable to control the linear motor, rotary motor, or both based on feedback from the sensor.

In a further embodiment of any of the foregoing embodiments, a support housing is included that has opposing first and second sides, and defines an internal cavity. The linear motor and rotary motor are mounted to the support housing. A driveshaft couples the linear motor to the tool and extends through the internal cavity. A central longitudinal axis of the rotary motor is parallel to and spaced apart from the longitudinal feed axis, and a drive mechanism within the internal cavity translates rotation of a spindle of the rotary motor to rotation of the driveshaft.

In a further embodiment of any of the foregoing embodiments, in an optimization mode, the controller is configured to command the linear and rotary motors to cooperate and perform a machining operation on a first workpiece portion while the linear motor provides linear movement at an initial feed velocity and superimposes the oscillation sequentially at a plurality of different frequencies. One of the plurality of different frequencies that causes the tool to apply less force to the first workpiece portion at the initial feed velocity than others of the frequencies at the initial feed velocity is determined to be an optimal oscillation frequency. In a run mode, the controller is configured to perform the machining operation on a second workpiece portion having a same composition as the first workpiece portion while superimposing the oscillation at the optimal oscillation frequency. The first workpiece portion and second workpiece portion are part of a same workpiece or different workpieces.

In a further embodiment of any of the foregoing embodiments, the sensor includes a displacement transducer operable to measure a linear displacement of the tool relative to the stator.

In a further embodiment of any of the foregoing embodiments, a sleeve is provided having a radially outer surface secured to the rotary motor, and a radially inner surface that engages a rotary shaft of the rotary motor and imparts rotation from the rotary motor to the rotary shaft and tool. A cross section of the rotary shaft has a non-circular shape that engages the radially inner surface.

In a further embodiment of any of the foregoing embodiments, the stator of the rotary motor includes a radial outer portion and a radial inner portion and a cavity therebetween, and the core of the linear motor at least partially received into the cavity.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

FIG. 4A schematically illustrates an example implementation of a rotary motor for the machining device of FIG. 1.

FIG. 4B schematically illustrates a cross-sectional view of an example sleeve of the rotary motor of FIG. 4A.

DETAILED DESCRIPTION

Figure 1:
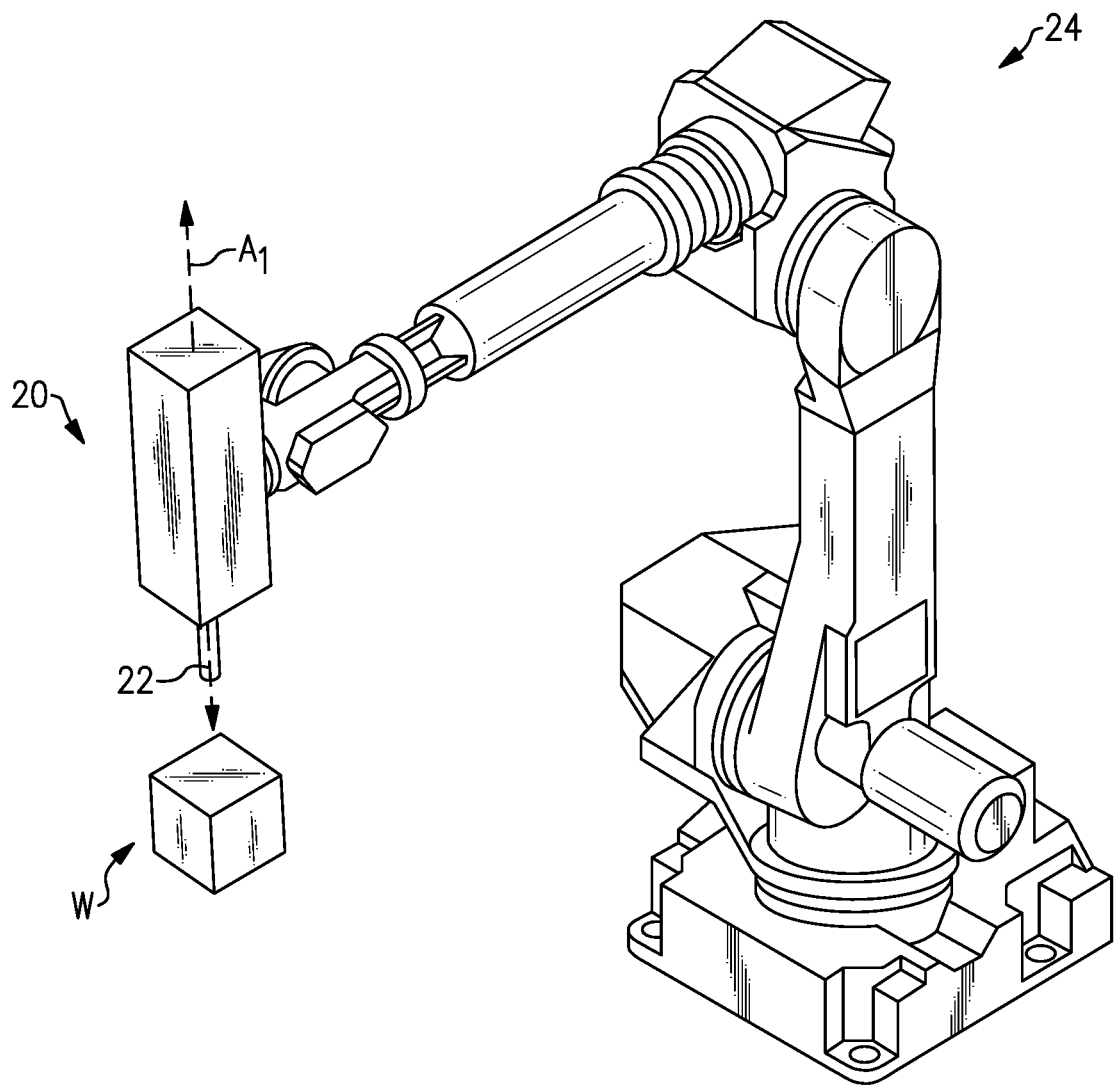
FIG. 1 is a schematic view of a machining device and an associated positioning device.

FIG. 1 is a schematic view of an electromagnetically-operated machining device 20 that is operable to perform a machining operation with a tool 22. A positioning device 24 is operable to position the machining device 20 relative to a workpiece W, and in particular a portion of the workpiece W that is to be machined. Once positioned, the machining device 20 can perform a machining operation on that portion of the workpiece W.

In one example, the positioning device 24 can be programmed to move the machining device 20 in six degrees of freedom. However, it should be appreciated that a six degree of freedom positioning system may not be necessary for some applications and as such, other positioning systems may be used.

During machining operations, the machining device 20 provides linear feed movement of the tool 22 along a feed axis A1 relative to the workpiece W while superimposing oscillation of the tool 22 onto the feed axis A1 onto the linear feed movement and providing rotation of the tool 22 relative to the workpiece. The rotation could be provided by rotating the tool 22 or rotating the workpiece W. By superimposing oscillation onto the linear feed movement, a thrust force applied by the tool 22 to the workpiece W can be reduced, thereby prolonging tool life, and also allowing use of faster feed velocities at a given force level than would otherwise be possible without the superimposed oscillation.

In one example, while the positioning device 24 is used to position the machining device 20 with respect to the workpiece, the positioning device 24 does not move relative to workpiece W and/or the machining device 20 during an actual machining operation because the machining device 20 itself provides for its own feed movement during machining operations.

The machining device 20 can be used to perform any of a plurality of different machining operations, such as drilling, milling, and turning. In a drilling operation, the tool 22 is rotated about axis A1 and is fed in a direction parallel to the axis A1 into the workpiece W to create a round hole. In a milling operation, the tool 22 is rotated about the axis A1 and fed in a direction perpendicular to the axis A1 into the workpiece W to cut a profile matching the tool 22. In a turning operation, the workpiece W is rotated and the tool 22 is fed either parallel or perpendicular to the rotating workpiece W to create a cylindrical product.

Figure 2:
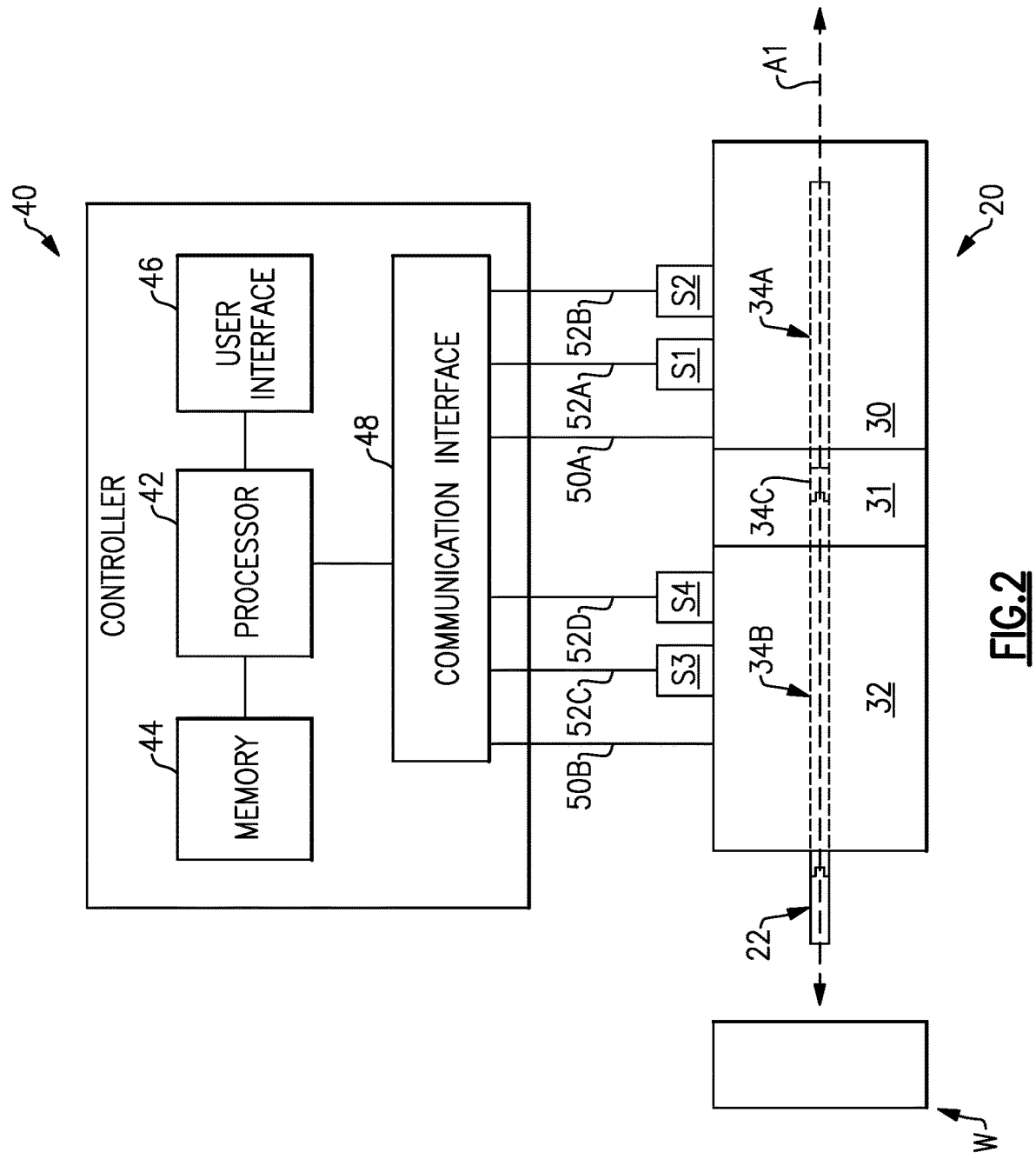
FIG. 2 is a schematic view of the machining device of FIG. 1 in greater detail.

FIG. 2 is a schematic view of the machining device 20 device of FIG. 1 in greater detail. As shown in FIG. 2, the machining device 20 includes a linear motor 30, a transition assembly 31, and a rotary motor 32 that are each coupled to a shaft 34. The shaft 34 includes a first section 34A within the rotary motor 32 that provides linear movement along the feed axis A1 but does not rotate. The driveshaft 34 also includes a second section 34B within the rotary motor 32 that does rotate, and therefore acts a drive shaft. The transition assembly 31 includes and intermediate section 34C that interconnects the two sections 34A-B.

The linear motor 30 is operable to provide linear movement of the tool 22 along the longitudinal axis A1 and is also operable to superimpose oscillation of the tool 22 onto the feed axis during the linear movement. The rotary motor 32 is operable to rotate the tool 22 about the longitudinal feed axis A1 during the linear feed movement. The linear motor 30 and rotary motor cooperate to perform a machining operation on the workpiece W. As shown in the example of FIG. 2, the longitudinal feed axis A1 extends through the rotary motor 32.

A controller 40 is operable to control the linear motor 30 and rotary motor 32. The controller 40 includes a processor 42 that is operatively connected to memory 44, a user interface 46, and a communication interface 48. The processor 42 may include one or more microprocessors, microcontrollers, application specific integrated circuits (ASICs), or the like, for example. The memory 44, may include one or several types of memory such as read-only memory (ROM), random-access memory, cache memory, flash memory devices, optical storage devices, etc. The user interface 46 includes an input device and an electronic display, which may be combined in the form of a touch screen, for example.

The controller 40 utilizes communication interface 48 to provide control signals to the machining device 20 over control lines 50A-B and receive feedback from sensors S1-S4 over feedback lines 52A-D. The controller 40 is operable to cause the linear motor 30 to provide the linear movement and superimpose the oscillation by oscillating a direct current (DC) control signal provided to the linear motor 30 over control line 50A.

By oscillating the DC control signal provided to the linear motor 30, the controller causes the linear motor 30 to both provide linear movement of a tool 22 along the feed axis A1 relative to the workpiece W and superimpose oscillation of the tool 22 onto the feed axis A1 during the linear movement.

The sensors S1-S4 provide feedback about the operations of the linear motor 30 and rotary motor 32 to provide for closed loop feedback control. The sensors S1-S2 are operable to measure at least one machining parameter related to linear movement of the tool 22, and the sensors S3-S4 are operable to measure at least one machining parameter related to rotary movement of the tool 22.

In one example configuration, sensors S1 and S3 are displacement transducers, and sensor S2 and S4 are current sensors. This configuration is useful because measuring current applied to a stator of the linear motor 30 is one way to measure a thrust force applied by the linear motor 30, and measuring a current applied to a stator of the rotary motor 32 is one way to measure a torque force applied by the rotary motor 32. The stators are discussed below.

Some example types of linear displacement transducers that could be used for the sensor S1 include a linear encoder, linear variable differential transformer (LVDT), or magnetorestrictive device. Some example types of rotary displacement transducers that could be used for the sensor S3 include a rotary encoder, rotary differential transformer (RVDT), or resolver. Of course, it is understood that these are non-limiting examples and that others types of displacement sensors could be used.

In one example, by utilizing the sensors S1-S2, the controller 40 is able to determine any of the following and use any of the following as process variables for the linear motor 30 in a closed loop control: linear displacement and position, feed velocity, linear acceleration, current applied to linear motor 30, and thrust force.

In the same or another example, by utilizing the sensors S3-S4, the controller 40 is able to determine any of the following and use any of the following as process variables in a closed loop control for the rotary motor 32: revolutions per minute (RPM), rotational velocity, rotational acceleration, current applied to rotary motor 32, and torque.

Although the sensors S1-S4 are shown as being disposed at the machining device 20, it is understood that they could be disposed at other locations (e.g., measuring current at the controller 40 instead of at the machining device 20) and/or that other quantities of sensors could be used.

Although not shown in FIG. 2, the machining device 20 may include a tool holder for interchanging various tools 22 with the machining device 20 (e.g., a 3-jaw chuck, a collet, a drill arbor, or a taper spindle).

In the example of FIG. 2, the linear motor 30 and rotary motor 32 both surround the longitudinal axis A1.

Figure 3:
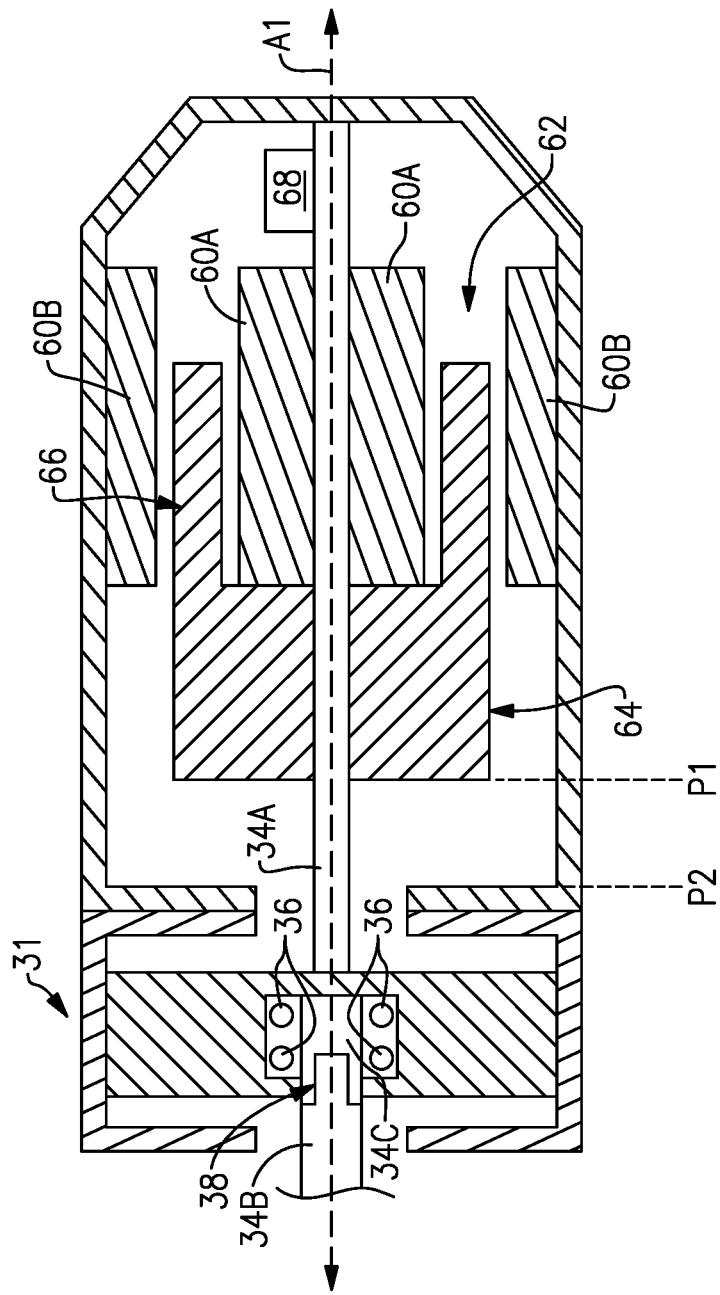
FIG. 3 schematically illustrates an example implementation of a linear motor and transition assembly for the machining device of FIG. 1.

FIG. 3 illustrates an example implementation of the linear motor 30 and transition assembly 31. A shown in the example of FIG. 3, the linear motor 30 includes a linear stator 60 that surrounds the feed axis A1. The linear stator 60 includes a radially inner portion 60A and a radially outer portion 60B which at least partially define an annular cavity 62 therebetween. A core 64 is moveable relative to the linear stator 60 from a position P1 to a position P2 to provide linear feed movement of the shaft 34 and the tool 22 coupled to the shaft 34.

The core 64 includes a hollow cylindrical portion 66 that is at least partially received into the cavity 62. FIG. 3 depicts the core 64 as being fully retracted, with the core 64 at position P1. Windings (not shown) surround portions of the core 64. As current is applied to windings, the core 64 moves linearly along the feed axis A1 towards position P2. A linear encoder 68 is provided to measure linear displacement of the core 64. Of course, as discussed above, other linear displacement transducers could be used. As the core 64 translates in the linear motor 30, the linear position of the core 64 can be determined as an incremental displacement value from a previous position or as an absolute position relative to a fixed datum.

In one example, an amplitude of the oscillation that is superimposed onto the feed movement is 0.0001"-0.0005". In a further example, the amplitude of the oscillation that is superimposed onto the feed movement is 0.0001"-0.0003". In either example, the amplitude of the oscillation is less than a distance between points P1 and P2 in FIG. 3. To provide for such precision, in one example the controller 40 has a resolution that is orders of magnitude greater than an amplitude of superimposed oscillation (e.g., if the amplitude is ±0.0002", then the resolution could be anywhere between 10 to 1,000 times greater). This increased resolution enables fine-tuned adjustments for closed loop control of the machining device 20.

In one example, the intermediate shaft section 34C mounts to the shaft section 34B through a splined connection whereby a portion 37 of the shaft section 34B is received into a cavity 38 within the intermediate shaft section 34C. Bearings 36 support rotation of the shaft sections 34B-C.

FIG. 4A illustrates an example implementation of the rotary motor 32, which includes a stator 70 and a rotor 72 that rotates relative to the stator 70. The stator 70 includes windings, and the rotor 72 includes a magnet assembly 74 that is coupled to the rotor 72 to rotate the rotor 72. Bearings 76 provide rotational support to the linear motor 30. As current is applied to the stator 70, rotation of the rotor 72 is provided. Sensor 77 measures rotary displacement of the shaft section 34B.

The rotary motor 32 includes a sleeve 78 having a radially outer surface 79B secured to the stator 70, and a radially inner surface 79A that engages the shaft section 34B and imparts rotation from the rotary motor 32 to the shaft section 34B and tool 22.

FIG. 4B schematically illustrates a cross-sectional view of the sleeve 78 and shaft 34. As shown in FIG. 4B, the shaft 34 has a non-circular shape that engages the radially inner surface 79A. Although FIG. 4B illustrates a hexagonal cross section for the shaft 34 and inner surface 79A, it is understood that other cross-sectional shapes could be used.

Those having ordinary skill in the art will appreciate that any electrical rotary motor including but not limited to AC and DC, synchronous and induction, brushed and brushless, and the like, known or later discovered and suitable for this purpose could be employed in place of the rotor 72 and stator 70 described above and that the device would still fall within the scope of the present invention.

In this disclosure, like reference numerals designate like elements where appropriate and reference numerals with the addition of one-hundred or multiples thereof designate modified elements that are understood to incorporate the same features and benefits of the corresponding elements.

Figure 5:
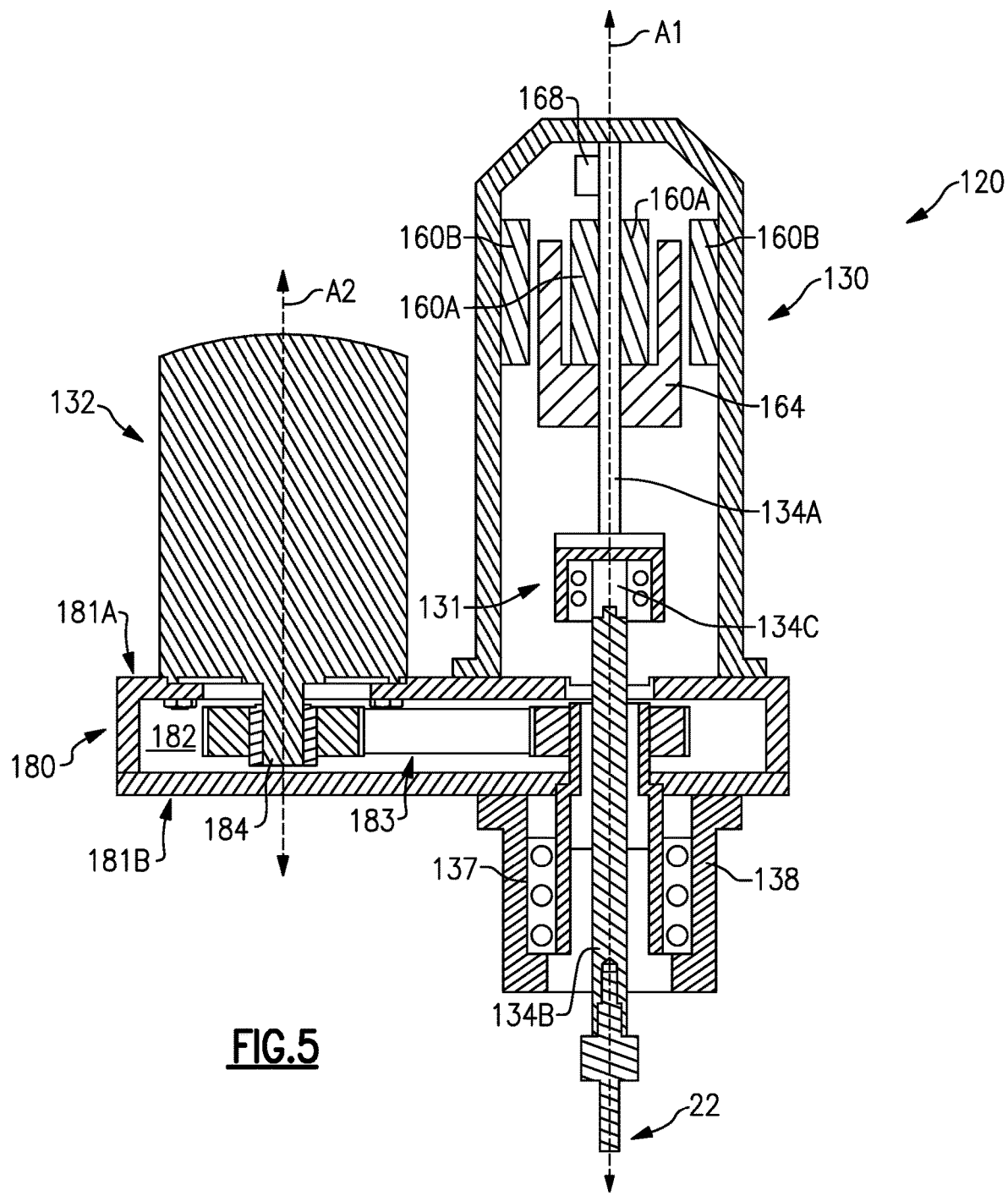
FIG. 5 illustrates another example machining device.

FIG. 5 illustrates another example configuration for a machining device 120 in which linear motor 130 provides feed movement along longitudinal feed axis A1 and rotary motor 132 rotates about axis A2 which is parallel and spaced apart from axis A1. Components 160A-B, 164, and 168 associated with the linear motor 130 operate in a similar manner to their counterparts in FIG. 3. Each of the linear motor 130 and rotary motor 132 are coupled to a support housing 180 which has opposing first and second sides 181A-B. An internal cavity is provided between the opposing sides 181A-B. A shaft 134 is provided having a first section 134A that does not rotate and a second section 134B that does rotate. A transition assembly 131 interconnects the two shaft sections 134A-B with a splined connection between shaft section 134B and intermediate shaft section 134C, whereby a portion 137 of the shaft section 134B is received into a cavity 138 within the intermediate shaft section 134C.

A drive mechanism 183 within the internal cavity 182 translates rotation of a spindle 184 of the rotary motor 132 to rotation of the shaft 134. The drive mechanism 183 can include a belt and/or geared architecture, for example.

Although internal details for the rotary motor 132 are not shown, it is understood that they could be similar to or the same as that of the rotary motor 32.

Also, although the linear motor 30 and rotary motor 32 are primarily discussed below, it is understood that the methods and features described below for the linear motor 30 and rotary motor 32 can also be applied to the linear motor 130 and rotary motor 132 unless otherwise specified.

The machining device 20/120 includes multiple operating modes, including an "optimization mode" and a "run mode." During the optimization mode, the machining operation is performed on a first workpiece portion while providing the linear feed movement at an initial feed velocity $V_{FM}$, and sequentially superimposing the oscillating at a plurality of different frequencies. Also during the optimization mode, one of the plurality of different frequencies that causes the tool to apply less thrust force to the first workpiece portion at the initial feed velocity than others of the frequencies at the initial feed velocity (e.g., the one that applies the least thrust force) is determined to be an optimal oscillation frequency.

During the run mode, the machining operation is performed on a second workpiece portion which may have the same composition as the first workpiece portion, while superimposing the oscillation at the optimal oscillation frequency. The first workpiece portion and second workpiece portion can be part of a same workpiece or can be part of different workpieces.

As used here, the "optimization mode" and "run mode" refer to operational modes of the controller 40 and not to a mode of vibration of the tool 22 or workpiece W. The optimization mode will now be described in greater detail in connection with FIG. 6.

Figure 6:
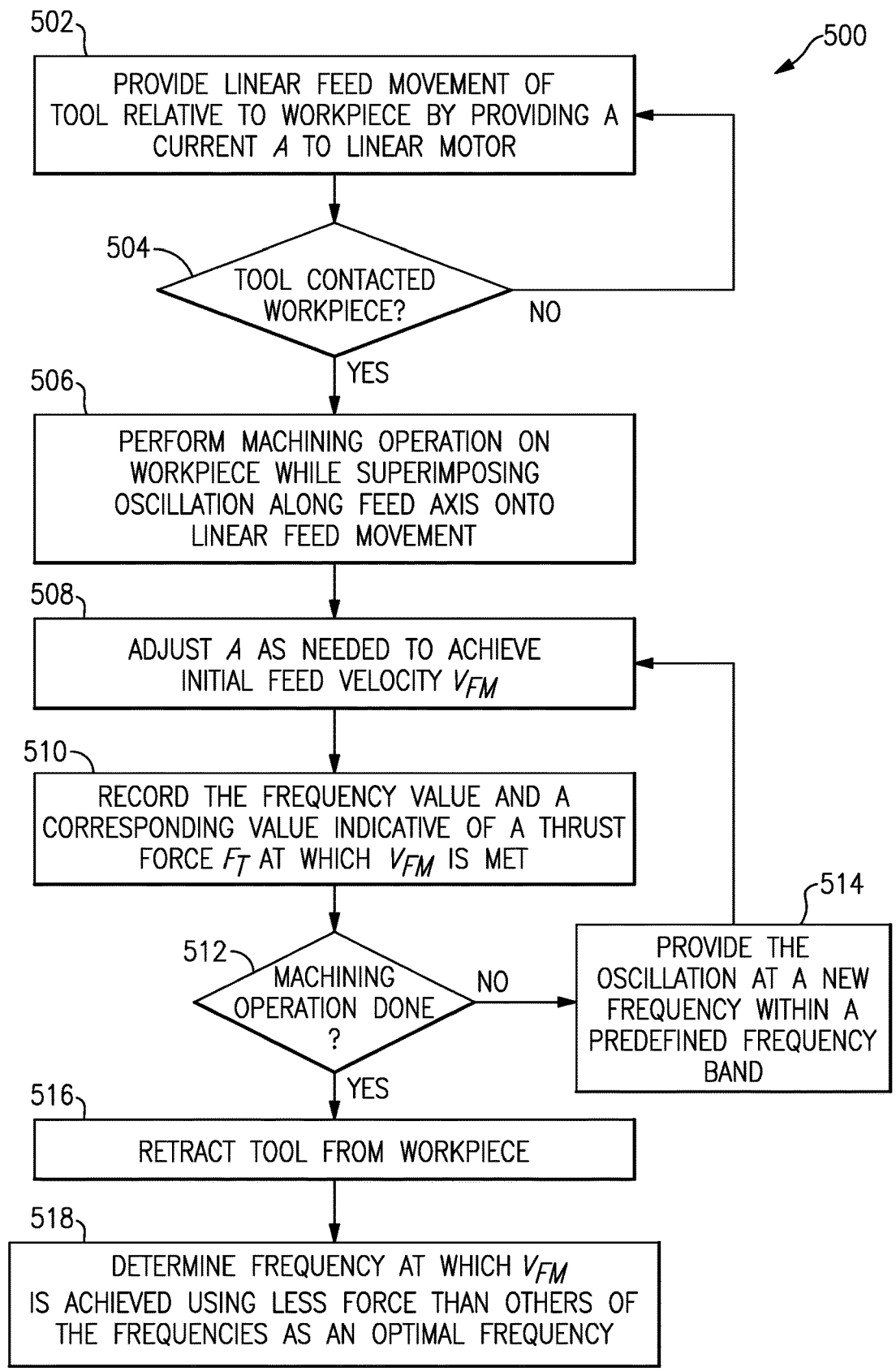
FIG. 6 is a flowchart showing an example optimization mode for the machining device of FIG. 1.

FIG. 6 is a flowchart 500 of an example of the optimization mode. Linear feed movement of the tool 22 relative to the workpiece W is provided by providing a current to linear stator 60 of the linear motor 30 (step 502). Rotation of the tool 22 relative to the workpiece W and/or superimposing oscillation onto the feed movement of the tool 22 can also be initiated at this time, or that can be postponed until the tool 22 contacts the workpiece W.

The controller 40 monitors to determine if the tool 22 has contacted the workpiece (step 504). One way that the controller 40 can detect workpiece W contact is by an increase in the current needed by the linear motor 30 to maintain a feed velocity used in step 502, because that current is representative of a thrust force applied by the linear motor 30. Another way that the controller 40 could determine contact is by utilizing a force sensor. A force sensor could be mounted internally or externally along on the shaft 134, either on the rotating portion 34B, 134B or the non-rotating portion 34A, 134A. As another example, a force sensor could be mounted to the workpiece W (e.g., with the workpiece W situated between the machining device 20/120 and the force sensor).

Upon detecting contact (a "yes" to step 504), the machining operation is performed on the workpiece while superimposing oscillation onto the feed axis onto the linear feed movement of the tool 22 and providing rotation of the tool 22 relative to the workpiece W (e.g., by rotary motor 32) (step 506). During the machining operation, the feed movement is provided at a feed velocity $V_{FM}$.

The feed velocity $V_{FM}$ is a velocity setpoint used by the controller 40 in a closed loop control algorithm. The controller 40 adjusts the current applied to the linear motor 30 as needed to achieve the desired linear movement feed velocity $V_{FM}$ (step 508). If the desired feed velocity for machining $V_{FM}$ is also used in step 502, the controller 40 will have to increase the current value provided to the linear motor 30 in order to maintain that feed velocity $V_{FM}$ once the tool 22 contacts the workpiece W.

The controller 40 records a frequency value and corresponding value indicative of a thrust force $F_T$ at which the velocity setpoint $V_{FM}$ is achieved (step 510). In one example, the controller 40 determines a thrust force applied by the tool 22 based on an amount of current applied to the linear stator 60 of the linear motor 30.

The controller 40 then initiates a frequency sweep within a first frequency band to sequentially superimpose the superimposed oscillation at a plurality of different frequencies (steps 512-514) until the machining operation is complete (a "yes" to step 512). As used herein, performing a frequency sweep involves utilizing a plurality of discrete frequencies within a frequency range with some interval between the frequencies. In one example, the frequency band used for the frequency sweep is 1-10,000 Hz. In a further example, the frequency band is 1-5,000 Hz. In a further example, the frequency band is 1-2,000 Hz.

The tool 22 is then retracted from the workpiece (step 516), and a frequency at which the velocity setpoint $V_{FM}$ is achieved using less thrust force than others of the frequencies is determined to be an optimal oscillation frequency $F_O$ (step 518). In one example, the frequency at which the velocity setpoint $V_{FM}$ is achieved using the least thrust force is determined to be the optimal oscillation frequency $F_O$.

In one example, the tool 22 is rotated at an approximately constant rotational velocity $V_{ROT}$ during the optimization mode, by using $V_{ROT}$ as a rotational velocity setpoint and adjusting an amount of current applied to stator 70 of the rotatory motor 32 as necessary to achieve the $V_{ROT}$.

In one example, the frequency sweep is terminated prior to completion of the machining operation if the sweep is completed before the machining operation is completed.

Figure 7:
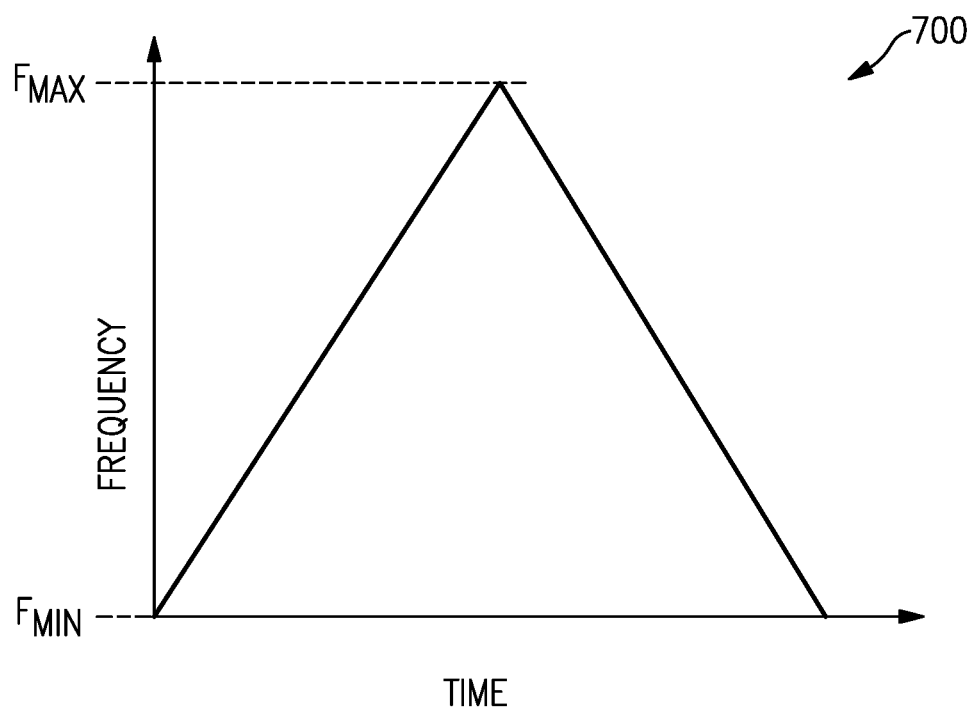
FIG. 7 illustrates a graph demonstrating performance of an example frequency sweep during a machining operation.

FIG. 7 illustrates a graph 700 demonstrating performance of an example frequency sweep during a machining operation, as depicted in the loop involving step 514 of FIG. 6. A shown in FIG. 7, the frequency oscillation sweep is performed starting from a first frequency $F_{min}$ which is swept up to a maximum frequency $F_{max}$ and is then swept down again to the first frequency $F_{min}$.

Figure 8:
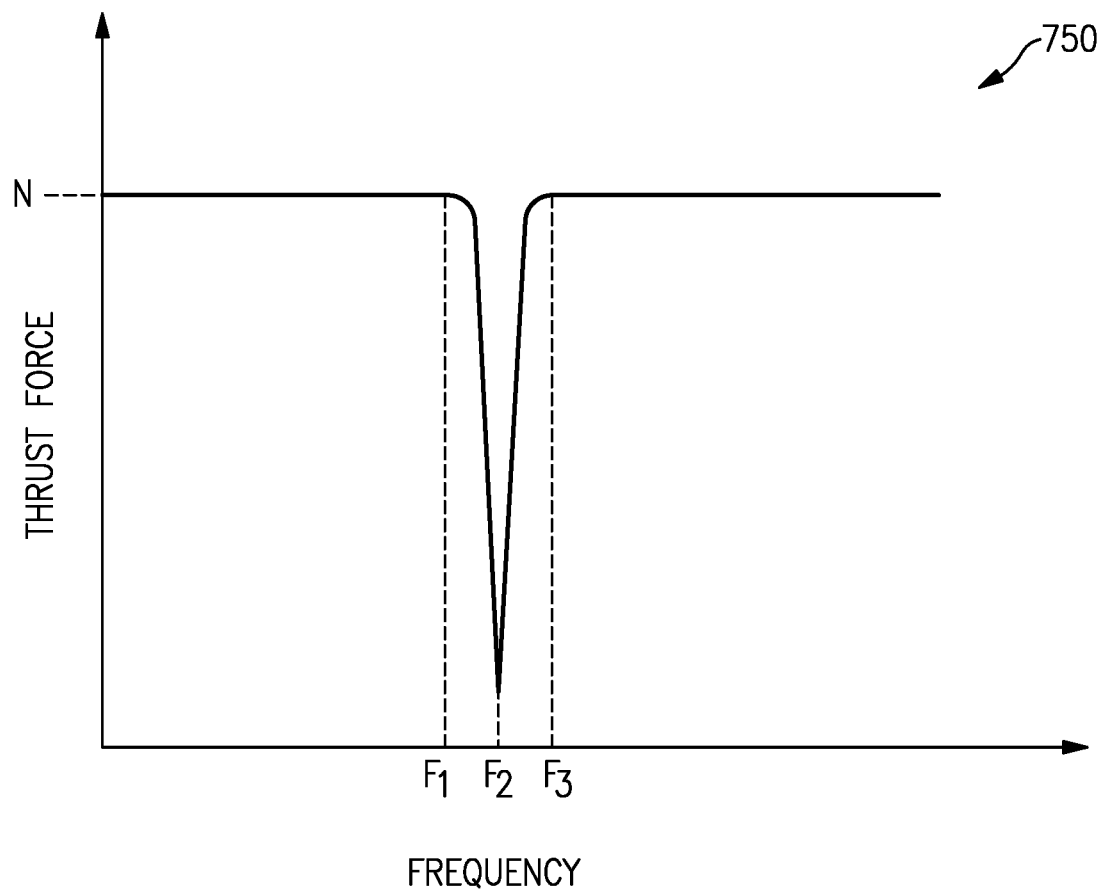
FIG. 8 illustrates a graph showing how a thrust force applied by the machining device varies during the frequency sweep of FIG. 7.

FIG. 8 illustrates a graph 750 showing how the thrust force $F_T$ applied by the tool 22 varies during the frequency sweep of FIG. 7 while performing the machining operation utilizing feed movement at the velocity $V_{FM}$ and sequentially superimposing oscillation at a plurality of different oscillation frequencies. As shown in FIG. 8, the thrust force $F_T$ drops significantly from value N within a frequency band bounded by frequencies $F_1$ and $F_3$, with a minimum thrust force being applied at frequency $F_2$. In one example, the controller 40 performs step 518 by determining the minimum force (e.g., force $F_2$) as the optimal oscillation frequency $F_O$. In another example, the controller performs step 518 by selecting a frequency within the frequency band $F_1$-$F_3$ as the optimal oscillation frequency $F_O$.

Figure 9:
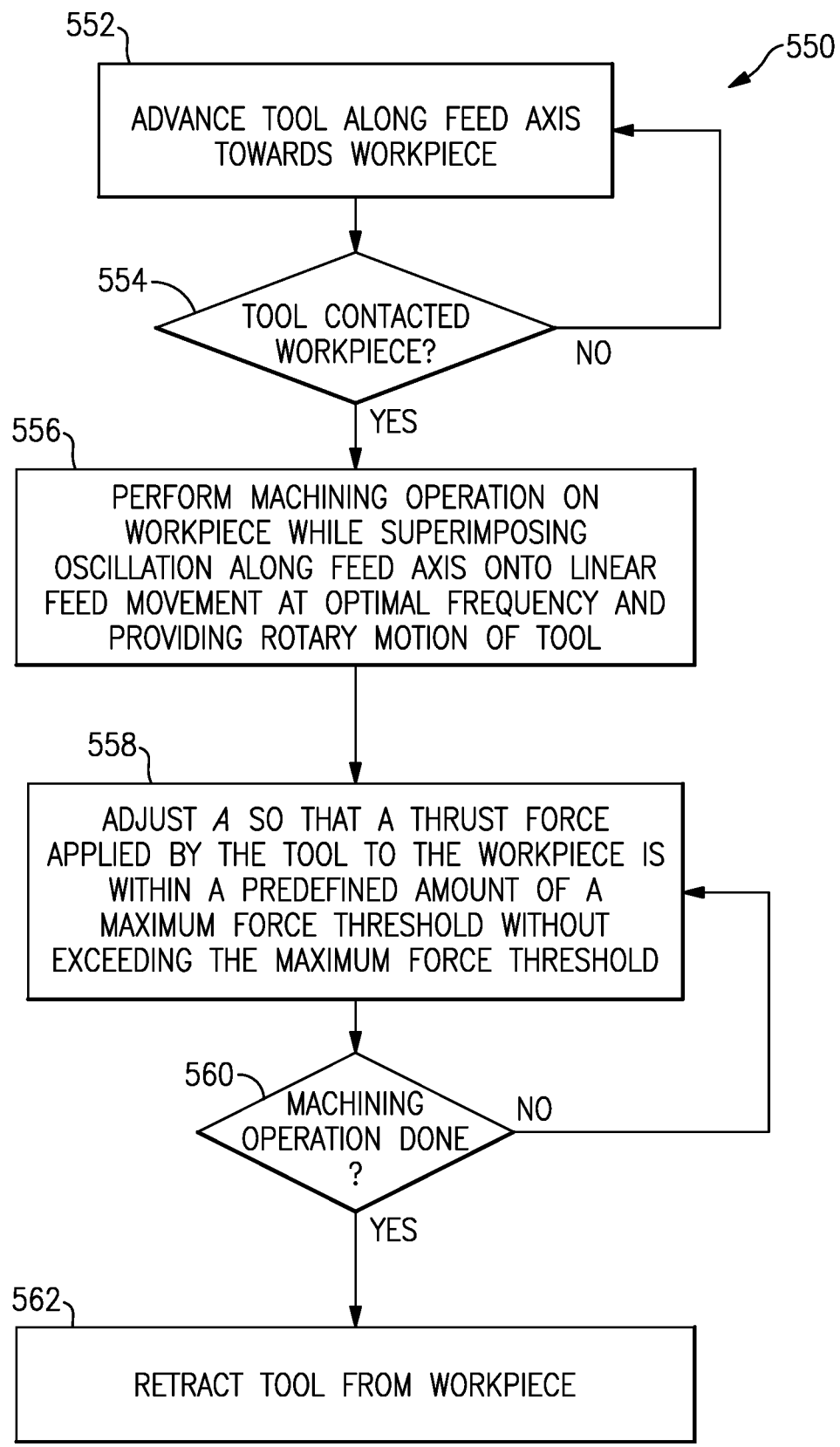
FIG. 9 is a flowchart of an example run mode for the machining device of FIG. 1.

FIG. 9 is a flowchart 550 of an example method for performing a machining operation in the "run mode" and utilizing the optimal oscillation frequency $F_O$ determined from the optimization mode of FIG. 6. The machining operation is performed on a second workpiece portion which can be part of the same or another workpiece utilized for the optimization mode of FIG. 6.

The tool 22 advances along the feed along the feed axis A1 towards the workpiece W (step 552). Once the tool 22 contacts the workpiece W (a "yes" to step 554), the machining operation is performed while superimposing oscillation onto the feed axis A1 onto linear feed movement at the optimal oscillation frequency $F_O$ and providing rotation of the tool 22 relative to the workpiece W (e.g., by rotating the tool 22 or workpiece W) (step 556).

The controller 40 utilizes a force mode for the next step 558, during which the controller 40 utilizes the optimal oscillation frequency $F_O$, and adjusts a current A applied to the linear stator 60 of the linear motor 30 so that the thrust force $F_T$ applied by the linear motor 30 is within a predefined amount of a maximum force threshold $F_{max}$ without exceeding the force $F_{max}$. This could be within a predefined percentage of $F_{max}$ (e.g., 2%, 3% 4%, 5%, or 10%) or it could be utilizing $F_{max}$ itself.

In one example, the force mode causes the machining device 20/120 to utilize a run mode feed velocity $V_R$ which is greater than the initial feed velocity $V_{FM}$ used in the optimization mode of FIG. 6. This can be achieved because use of the optimal oscillation frequency $F_O$ reduces the force that would otherwise be applied, balancing out the increase in thrust force provided by the increased feed velocity.

In one example, the force mode also has a maximum "do not exceed" velocity that the controller 40 is configured to avoid exceeding, which can be based on user preference.

Upon completion of the machining operation (a "yes" to step 560), the tool 22 is retracted from the workpiece (step 562).

Figure 10A:
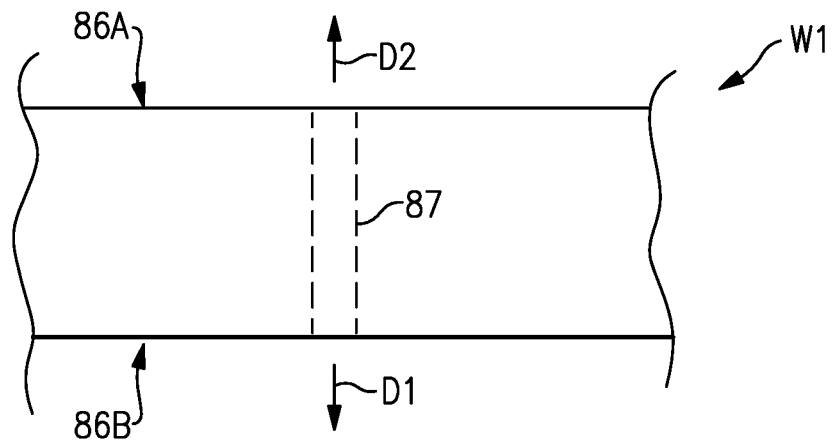
FIG. 10A illustrates an example single-layer workpiece.

FIG. 10A illustrates an example single-layer workpiece W1 having a first side 86A and an opposing second side 86B. In one example, the machining operation performed by the machining device 20/120 is a drilling operation that drills a hole 87 from the first side 86A to the second side 86B of the workpiece W1 in a direction D1. In such an example, the controller 40 can determine that the tool 22 has advanced beyond the second side 86B based on a rate of change of a feed velocity applied by the tool 22 exceeding a predefined threshold. The increase in feed velocity occurs quickly when the tool 22 advances beyond the second side 86B because there is considerably less resistance to linear feed movement of the tool 22 after the tool 22 advances beyond the second side 86B. Although a hole is shown that passes through the workpiece W1, it is understood that blind holes could be drilled by the tool 22 additionally using displacement monitoring and control to ensure that the blind hole does not extend through the workpiece W (e.g., using sensor S1 or S2 associated with the linear motor 30).

As discussed above, the controller 40 superimposes oscillation onto linear feed movement of the tool 22 during a machining operation. In one example, the controller 40 also superimposes oscillation of the tool 22 onto the feed axis A1 during retraction of the tool 22 from a workpiece W in a direction D2 that is opposite the direction D1. Such oscillation during retraction can be beneficial for a variety of reasons. For drilling machining operations, as an example, oscillation during retraction can help minimize and/or remove burrs that would otherwise form on the second side 86B along a perimeter of the opening 87.

Figure 10B:
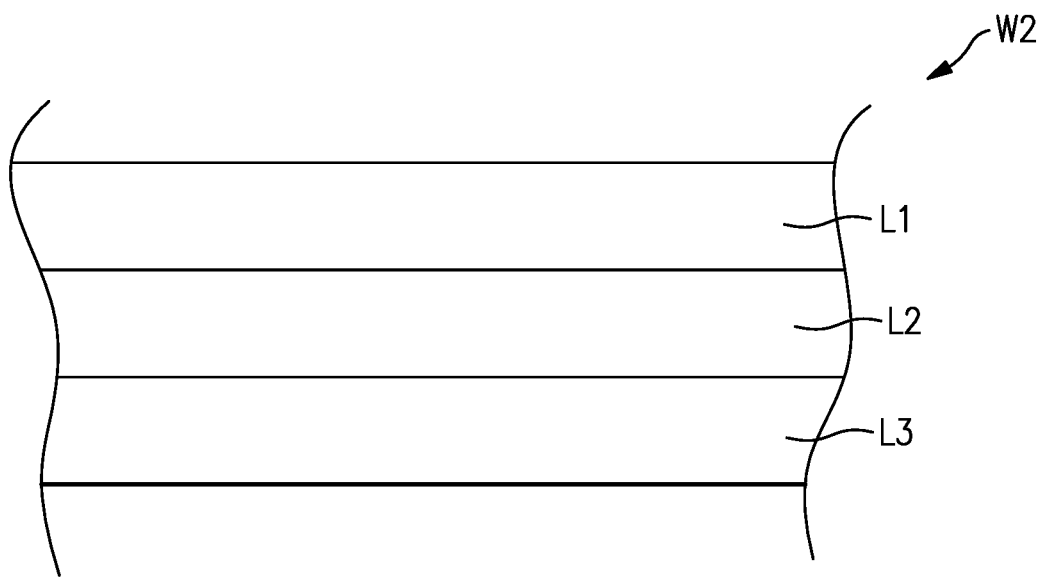
FIG. 10B illustrates an example multi-layer workpiece.

FIG. 10B illustrates another example workpiece W2 which includes a plurality of layers L1, L2, and L3 that have different compositions. One or more of the layers may be laminate layer, for example. In one example, the controller 40 determines an optimal oscillation frequencies for each of the layers L1-L3 during the optimization mode, and then subsequently during the run mode the controller 40 performs the machining operation on a portion of a workpiece that has the same composition by using the optimal oscillation frequencies determined during the optimization mode.

Some workpieces may have non-homogenous zones due to non-uniform physical properties, such as differing densities. In one example, the controller 40 includes an adaptive run mode for adjusting the optimal oscillation frequency for the non-homogenous zone of a workpiece.

Figure 11:
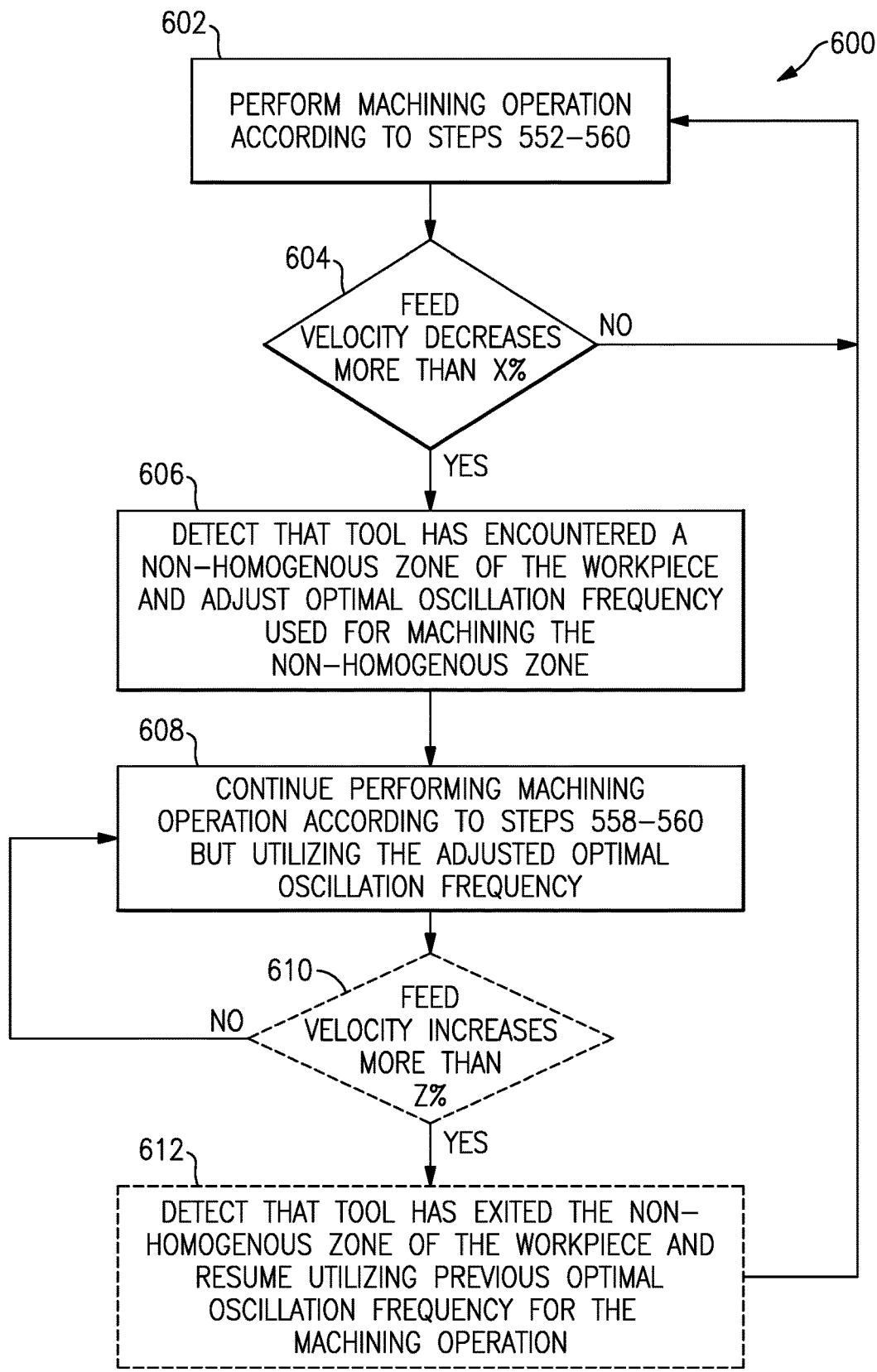
FIG. 11 is a flowchart of an example adaptive run mode for the machining device of FIG. 1.

FIG. 11 is a flowchart 600 of an example adaptive run mode for the machining device 20/120. The machining device 20/120 begins by performing a machining operation according to steps 552-560 described above. Upon detecting that the feed velocity decreases by more than a predefined percentage X % (a "yes" to step 604), the controller 40 detects that the tool 22 has encountered a non-homogenous zone of the workpiece W and adjusts its optimal oscillation frequency for machining the non-homogenous zone.

In one example, the adjustment involves superimposing different oscillation frequencies to see which provides for a reduced thrust force at a given feed velocity, as described in steps 508-514 of the method 500. This could include performing a frequency sweep, for example using a second frequency band. In one particular example, the second frequency band of the frequency sweep for the adaptive run mode is smaller than the first frequency band of the frequency sweep for the optimization mode (e.g., ±Y % of the optimal oscillation frequency for the homogenous portion of the workpiece).

Thus, based on the determination of step 606 that the tool 22 has encountered the non-homogenous zone, the controller 40 entering an adaptive run mode which includes sequentially superimposing the oscillating at a second plurality of different frequencies, and modifying the optimal oscillation frequency for at least the non-homogenous zone of the workpiece W to one of the second plurality of different frequencies that enables the tool to apply less thrust force to the non-homogenous zone at a given feed velocity than the unmodified optimal oscillation frequency (i.e., prior to the adjustment of step 606), enables the tool to travel at a higher feed velocity in the non-homogenous zone at a given thrust force than the un-modified optimal oscillation frequency, or both. In one example, the modified optimal oscillation frequency is the oscillation frequency that provides the least thrust force at a given feed velocity (and optionally a fixed rotational tool speed) to the workpiece within the second frequency band and/or that enables the highest feed velocity at a given thrust force level (and optionally at a fixed rotational tool speed) within the second frequency band.

Once the adjusted optimal oscillation frequency is determined, the controller 40 continues performing the machining operation according to steps 558-560 but using the adjusted optimal oscillation frequency (step 608).

Optionally, the controller 40 monitors (step 610) to see if the feed velocity increases by more than Z % which indicates that the tool 22 has exited the non-homogenous zone, and if the tool 22 has exited the non-homogenous zone the controller 40 resumes use of the previous optimal oscillation frequency (step 612). In one example, X % of step 604 and y % of step 610 are the same. Steps 610-612 are shown with a dotted outline to indicate that they are optional steps. If the tool 22 encounters a second non-homogenous zone, steps 604-608 could be repeated for that additional non-homogenous zone.

In one example, the controller 40 skips steps 610-612 and continues to use the modified optimal oscillation frequency for the rest of the machining operation, even if the tool 22 has exited the non-homogenous zone.

In a similar manner to how the controller 40 performs a frequency sweep to determine an optimal oscillation frequency while utilizing an approximately constant rotational velocity, the controller 40 could perform a sweep of tool 22 rotational velocities while utilizing a fixed oscillation frequency.

Figure 12:
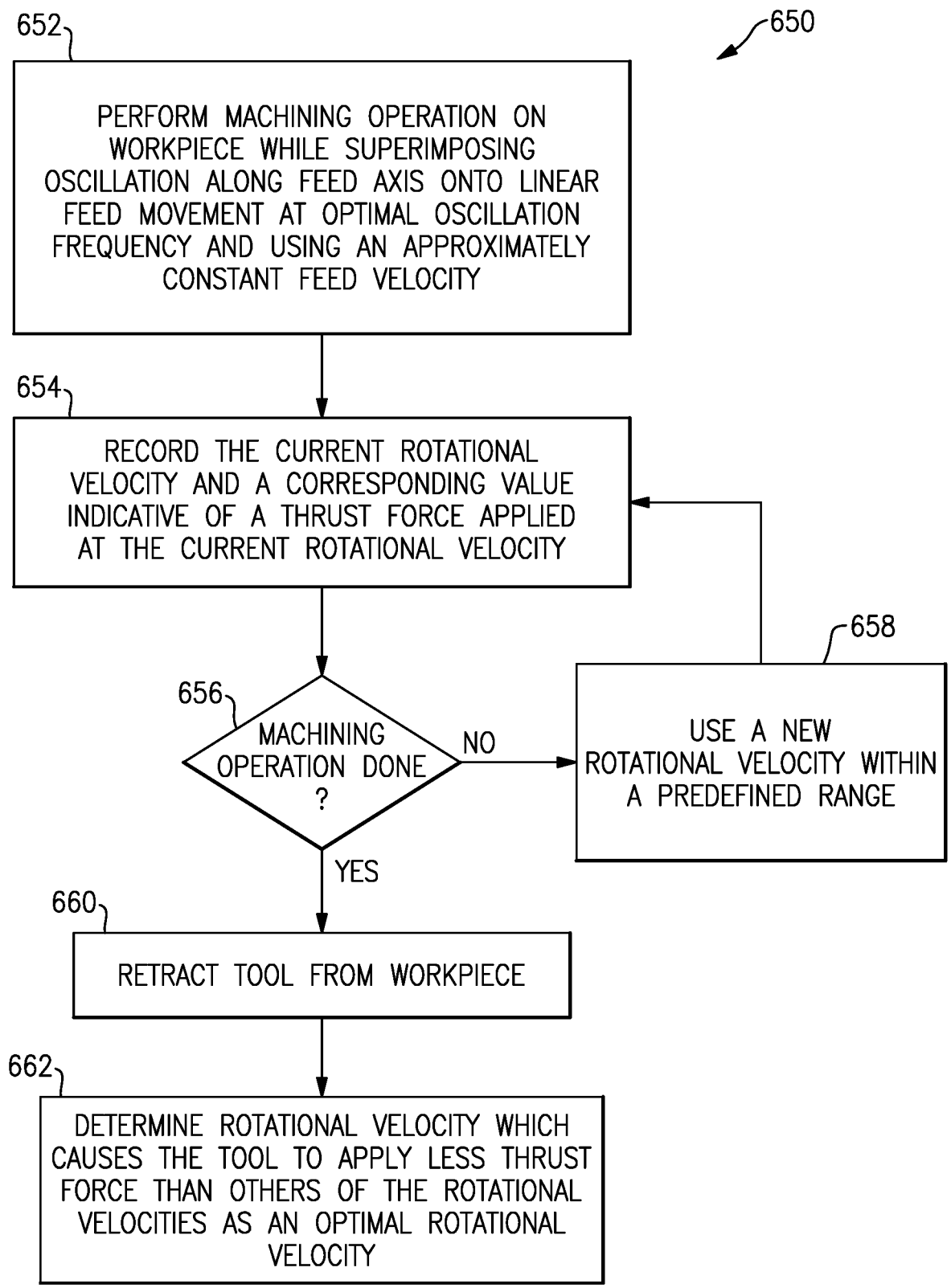
FIG. 12 is a flowchart showing an example optimization mode for optimizing a rotational velocity of the machining device of FIG. 1.

FIG. 12 is a flowchart 650 showing a method of determining an optimal rotational velocity. The controller 40 performs a machining operation on workpiece W while superimposing oscillation onto feed axis A1 onto linear feed movement of the tool 22 at the optimal oscillation frequency determined by method 500 for the workpiece and using an approximately constant feed velocity (step 652).

The controller 40 records the current rotational velocity and a corresponding value indicative of a torque applied by the rotary motor 32 at the current rotational velocity (step 654).

The controller 40 then utilizes a plurality of different rotational velocities within a predefined range and determines an associated thrust force $F_T$ at each rotational velocity (the loop of steps 658-654). Once the machining operation is complete (a "yes" to step 656), the tool 22 is retracted from the workpiece W (step 660), and the controller determines a rotational velocity which causes the tool 22 to apply less thrust force $F_T$ at the optimal oscillation frequency than others of the rotational velocities as an optimal rotational velocity (step 662). In one example, the rotational velocity at which the thrust force $F_T$ is lowest is determined to be the optimal oscillation rotational velocity. If the optimal rotational velocity causes a lowered thrust force, this reduction can potentially be used to increase the feed velocity of the tool 22 while still avoiding exceeding a maximum force threshold.

The optimal rotational velocity can then be used at the optimal oscillation frequency for machining operations.

In one example, the determination of the optimal oscillation frequency (flowchart 500) and the determination of the optimal rotational velocity (flowchart 650) are iteratively performed by re-determining the optimal oscillation frequency at the optimal rotational velocity, and re-determining the optimal rotational velocity at a new optimal oscillation frequency. This iterative performance could further reduce a force applied to a workpiece by the tool 22.

In one example, the controller 40 stores optimal machining parameters in memory 44, such as optimal oscillation frequencies to be superimposed on to linear feed movement and/or optimal rotational velocities for a variety of materials. The user interface 46 of the controller 40 can be utilized by an operator to recall those optimal values so that the optimization mode can be performed once for a plurality of machining operations for workpieces having a given composition.

The machining device 20/120 discussed above provides a number of benefits, including providing linear feed movement and superimposing oscillation from a single linear motor 30. This provides for space reduction and, if desired, allows a positioning device to avoid moving the machining device 20/120 and/or avoid moving the workpiece W during certain machining operations. Prior art devices which provided for oscillation during machining did not do so from a single linear motor, but rather utilized separate devices for feed movement and oscillation. Also, those devices provided oscillation not through superimposing oscillation onto a DC control signal provided to a linear motor, but instead by using secondary devices such as piezo elements, hydraulics, or induction coils, which suffer from one of more of the following: being less precise than the machining device 20/120, being limited in range of motion compared to the machining device 20/120, utilizing more space than the machining device 20/120, being more costly than the machining device 20/120, and having limited resolution for closed loop feedback control compared to the machining device 20/120. The integrated multi-axis self-contained machining device 20/120 lends itself to portability as an end effector to a delivery device such as a robot for large workpieces (e.g., motor vehicles, aircraft, vessels, etc.).

Also, the techniques described herein for identifying optimal oscillation frequencies and rotational speeds provide for reducing thrust force and torque, which enables the use of increased feed velocities without exceeding maximum force thresholds, thereby reducing the time required for machining operations, improving tool life, and enhancing the desired machined feature geometry and/or integrity.

Although the methods described in flowcharts 500, 550, 600, and 650 have been described in connection with the machining device 20/120 which utilizes a single linear motor 30/130 to provide for both linear feed movement and the superimposing of oscillation onto the linear feed movement, it is understood that the methods could also be used to control machining devices that utilize separate devices to provide for feed movement and oscillation (e.g., a linear motor for feed movement and a piezoelectric or electroacoustic device to provide oscillation) and/or that use techniques such as hydraulics, piezo elements, and/or electroacoustic transducers to provide for vibration.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method of operating a machine tool, the machine tool having a tool, a linear motor, a rotary motor, and a controller, the method comprising:
    oscillating a direct current (DC) control signal provided to the linear motor, thereby causing the linear motor to provide linear movement of the tool along a feed axis relative to a stator of the linear motor and to oscillate the tool during a feed movement, such that an oscillation is superimposed onto the linear movement; and
    rotating the tool about the feed axis with the rotary motor during the linear movement, as part of a machining operation, wherein in an optimization mode, the controller is configured to:
        command the linear and rotary motors to cooperate and to perform machining on a first workpiece portion while the linear motor provides said linear movement at an initial feed velocity and superimposes the oscillation sequentially at a plurality of different frequencies; and
        determine one of the plurality of different frequencies that causes the tool to apply less force to the first workpiece portion at the initial feed velocity than others of the plurality of different frequencies at said initial feed velocity to be an optimal oscillation frequency; and
    wherein in a run mode, the controller is configured to perform machining on a second workpiece portion having a same composition as the first workpiece portion while superimposing the oscillation at the optimal oscillation frequency.

2. The method of claim 1, comprising:
    utilizing a sensor to measure at least one machining parameter related to the linear movement, rotation of the tool, or both; and
    controlling the linear motor, the rotary motor, or both based on feedback from the sensor.

3. The method of claim 2, wherein
    utilizing the sensor comprises utilizing a displacement transducer to measure a linear displacement of the tool relative to the linear motor.

4. The method of claim 1, wherein
    the rotating the tool comprises:
        rotating a spindle of the rotary motor about a rotational axis that is spaced apart from the feed axis; and
    utilizing a drive mechanism to translate rotation of the spindle to rotation of a driveshaft that couples the linear motor to the tool.

5. The method of claim 1, comprising:
    superimposing oscillation onto the feed movement at a first oscillation frequency during machining of a first layer of a plurality of layers of a workpiece; and
    superimposing oscillation onto the feed movement at a second oscillation frequency that is different from the first oscillation frequency during machining of a second layer of the plurality of layers of the workpiece.

6. The method of claim 1, comprising:
    advancing the tool in a first direction to contact a workpiece portion during the machining operation; and
    after the machining operation:
        retracting the tool away from the workpiece portion along the feed axis in a second direction opposite the first direction; and
        superimposing oscillation of the tool onto the feed axis during said retracting.

7. The method of claim 1, wherein the machining operation is a drilling operation that drills a hole from a first side of a workpiece portion to a second side of the workpiece portion, the second side opposite to the first side, the method further comprising:
    determining that the tool has advanced beyond the second side based on a rate of change of a feed velocity of the tool exceeding a predefined threshold.

8. The method of claim 1, comprising:
    in a first mode and during a first machining operation, providing linear movement of the tool at a predefined feed velocity with superimposed oscillation, and adjusting an amount of current provided to the linear motor based on a feedback signal from a position sensor to maintain the predefined feed velocity; and in a second mode and during a second machining operation, providing linear feed movement of the tool with superimposed oscillation, and controlling a thrust force applied by the tool during the second machining operation to be within a predefined amount of a maximum force threshold without exceeding a maximum force threshold.

9. The method of claim 1, wherein the controller determining the one of the plurality of different frequencies that causes the tool to apply less force to the optimization workpiece portion at the initial feed velocity than the others of the plurality of different frequencies includes determining whichever of the plurality of different frequencies causes the tool to apply a smallest amount of force to the first workpiece portion at the initial feed velocity to be the optimal oscillation frequency.

10. The method of claim 1, comprising:

performing a frequency sweep within a frequency band to superimpose the oscillation at the plurality of different frequencies.

11. The method of claim 1, wherein the first workpiece portion has a plurality of layers, and the second workpiece portion has a plurality of layers corresponding to the plurality of layers of the first workpiece portion; and during the optimization mode, the optimal oscillation frequency for each of the plurality of layers of the first workpiece portion is determined; and during the run mode, for each layer of the second workpiece portion, the optimal oscillation frequency of the corresponding layer of the first workpiece portion is utilized.

12. The method of claim 1, wherein the tool is a rotary tool that rotates about a longitudinal feed axis, and rotating the rotary tool occurs at an approximately constant rotational velocity during the optimization mode.

13. The method of claim 12, wherein during an additional optimization mode, the controller is configured to:
  perform the machining operation on a third workpiece portion while superimposing the oscillating at the optimal oscillation frequency and rotating the tool at a plurality of different rotational velocities;
  determine one of the plurality of different rotational velocities that causes the tool to apply less thrust force to the third workpiece portion while oscillating at the optimal oscillation frequency than others of the rotational velocities at the optimal oscillation frequency to be an optimal rotational velocity; and during the run mode, the controller is configured to:
  rotate the tool at the optimal rotational velocity;
  wherein the third workpiece portion is part of a same workpiece portion as at least one of the first and second workpiece portions or is part of a different workpiece portion than each of the first and second workpiece portions.

14. The method of claim 1, wherein the controller is configured to:

determine that the tool has encountered a non-homogenous zone of the second workpiece portion based on a linear feed velocity of the tool changing by more than a predefined percent while the oscillating is superimposed at the optimal oscillation frequency; and enter an adaptive run mode based on the determination that the tool has encountered the non-homogenous zone by sequentially superimposing the oscillation at a second plurality of different frequencies, and modifying the optimal oscillation frequency for at least the non-homogenous zone of the workpiece portion to one of the second plurality of different frequencies that enables the tool to apply less thrust force to the non-homogenous zone at a given feed velocity than the optimal oscillation frequency, thereby enabling the tool to travel at a higher feed velocity in the non-homogenous zone at a given thrust force than the optimal oscillation frequency, or both.

* * * * *